US012349671B1

(12) United States Patent
Campbell

(10) Patent No.: US 12,349,671 B1
(45) Date of Patent: Jul. 8, 2025

(54) AERIAL WATERFOWL DECOY

(71) Applicant: Sean Campbell, Jamaica, NY (US)

(72) Inventor: Sean Campbell, Jamaica, NY (US)

( * ) Notice: Subject to any disclaimer, the term of this patent is extended or adjusted under 35 U.S.C. 154(b) by 0 days.

(21) Appl. No.: 18/761,583

(22) Filed: Jul. 2, 2024

(51) Int. Cl.
*A01M 31/06* (2006.01)

(52) U.S. Cl.
CPC ................... *A01M 31/06* (2013.01)

(58) Field of Classification Search
CPC .................................................... A01M 31/06
See application file for complete search history.

(56) References Cited

U.S. PATENT DOCUMENTS

| | | |
|---|---|---|
| 7,472,508 B2 | 1/2009 | Myers, IV |
| 8,266,836 B2 | 9/2012 | Ware |
| 9,924,711 B1 | 3/2018 | Gill |
| 10,212,929 B2 | 2/2019 | Janzen, Jr. |
| 10,321,674 B1 | 6/2019 | Goodwin |
| 10,765,107 B2 | 9/2020 | Peoples |
| 11,603,197 B2 * | 3/2023 | Bublitsky .............. B64U 30/12 |
| D999,875 S | 9/2023 | Uptegrove |
| 2009/0194634 A1 * | 8/2009 | Stelte ........................ F41H 3/00<br>244/1 R |
| 2011/0067289 A1 | 3/2011 | Lane |
| 2016/0095305 A1 * | 4/2016 | Drahota ................ A01M 31/06<br>43/3 |
| 2016/0183514 A1 * | 6/2016 | Dederick ............... B64U 10/14<br>119/713 |
| 2016/0198702 A1 * | 7/2016 | Forrester ............... A01M 31/06<br>43/3 |
| 2017/0055517 A1 * | 3/2017 | Morente Sanchez . A01M 29/16 |

FOREIGN PATENT DOCUMENTS

CA           3065593         6/2020

* cited by examiner

*Primary Examiner* — Jessica B Wong
(74) *Attorney, Agent, or Firm* — Kyle A. Fletcher, Esq.

(57) ABSTRACT

The aerial waterfowl decoy may include a drone, a plurality of floats, and a remote control unit. The drone may be a tricopter unmanned aerial vehicle. The drone may be adapted to resemble a waterfowl such that the drone may be used as a decoy proximate to hunted waterfowl. The remote control unit may be adapted for a user to operate in order to control the flight of the drone. The remote control unit may display video sent from a camera within the drone. A sound transducer in the drone may be configured to play audible waterfowl calls. The plurality of floats may detachably couple to the bottom of the drone to enable the drone to float on a body of water. As a non-limiting example, the drone may be adapted to resemble a duck.

20 Claims, 7 Drawing Sheets

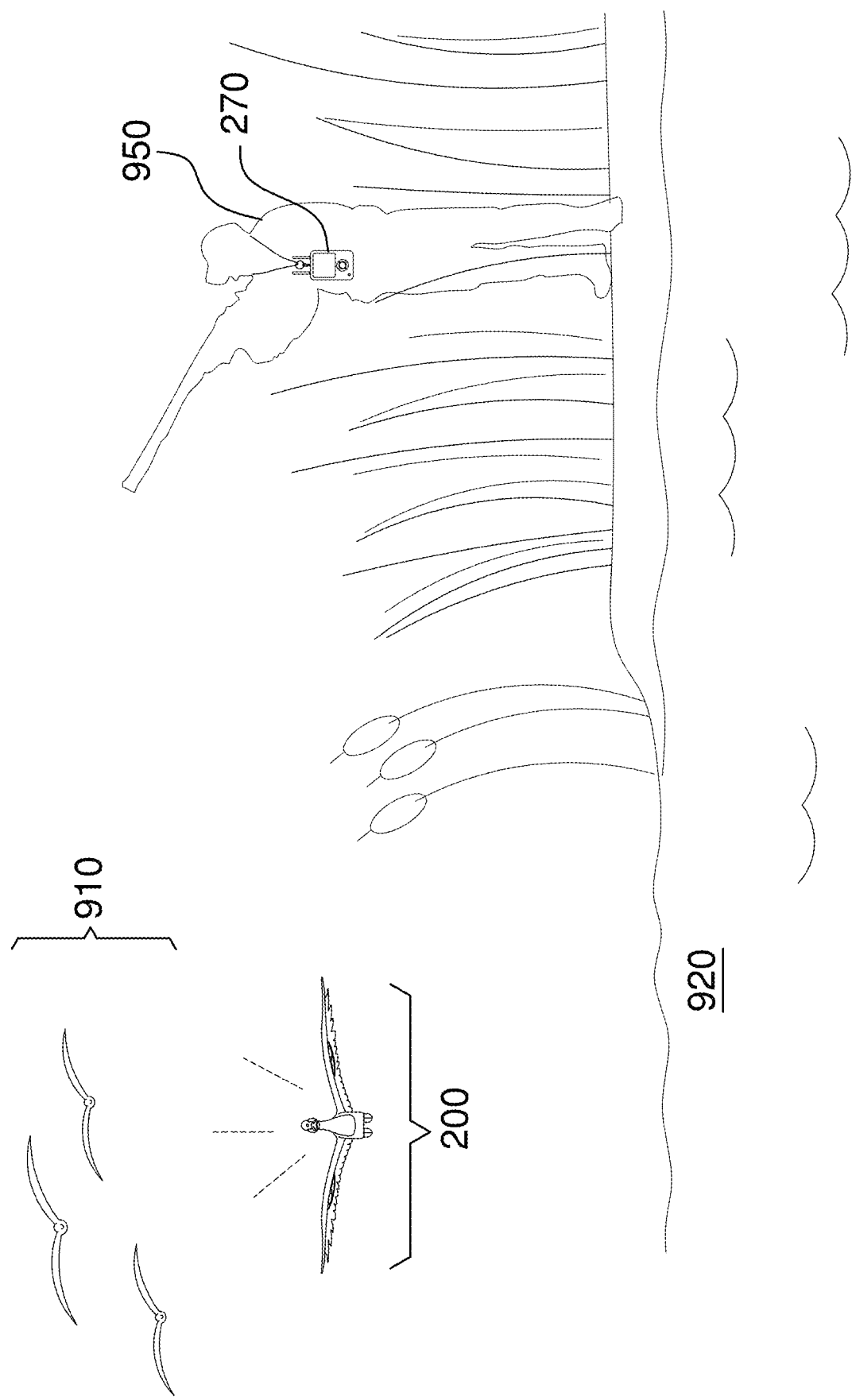

AERIAL WATERFOWL DECOY

CROSS REFERENCES TO RELATED APPLICATIONS

This application is a continuation-in-part of U.S. application Ser. No. 18/636,408, filed Apr. 16, 2024, which is incorporated by reference herein in its entirety.

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the fields of hunting decoys and aerial drones, more specifically, an aerial waterfowl decoy.

SUMMARY OF INVENTION

The aerial waterfowl decoy may comprise a drone, a plurality of floats, and a remote control unit. The drone may be a tricopter unmanned aerial vehicle. The drone may be adapted to resemble a waterfowl such that the drone may be used as a decoy proximate to hunted waterfowl. The remote control unit may be adapted for a user to operate in order to control the flight of the drone. The remote control unit may display video sent from a camera within the drone. A sound transducer in the drone may be configured to play audible waterfowl calls. The plurality of floats may detachably couple to the bottom of the drone to enable the drone to float on a body of water. As a non-limiting example, the drone may be adapted to resemble a duck.

An object of the invention is to provide a drone that resembles a waterfowl.

Another object of the invention is to provide a plurality of propellers and a controller within the drone and a remote control unit configured to control flight operations of the drone.

A further object of the invention is to provide a camera within the drone that is configured to stream video to a display on the remote control unit and a sound transducer within the drone that may produce audible waterfowl calls.

Yet another object of the invention is to provide a plurality of floats that may detachably coupled to the bottom of the drone to make the drone buoyant.

These together with additional objects, features and advantages of the aerial waterfowl decoy will be readily apparent to those of ordinary skill in the art upon reading the following detailed description of the presently preferred, but nonetheless illustrative, embodiments when taken in conjunction with the accompanying drawings.

In this respect, before explaining the current embodiments of the aerial waterfowl decoy in detail, it is to be understood that the aerial waterfowl decoy is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the aerial waterfowl decoy. It is therefore important that the claims be regarded as including such equivalent construction insofar as they do not depart from the spirit and scope of the aerial waterfowl decoy. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

FIG. 7 is an in-use view of an embodiment of the disclosure.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description. As used herein, the word "or" is intended to be inclusive.

Figure 1:
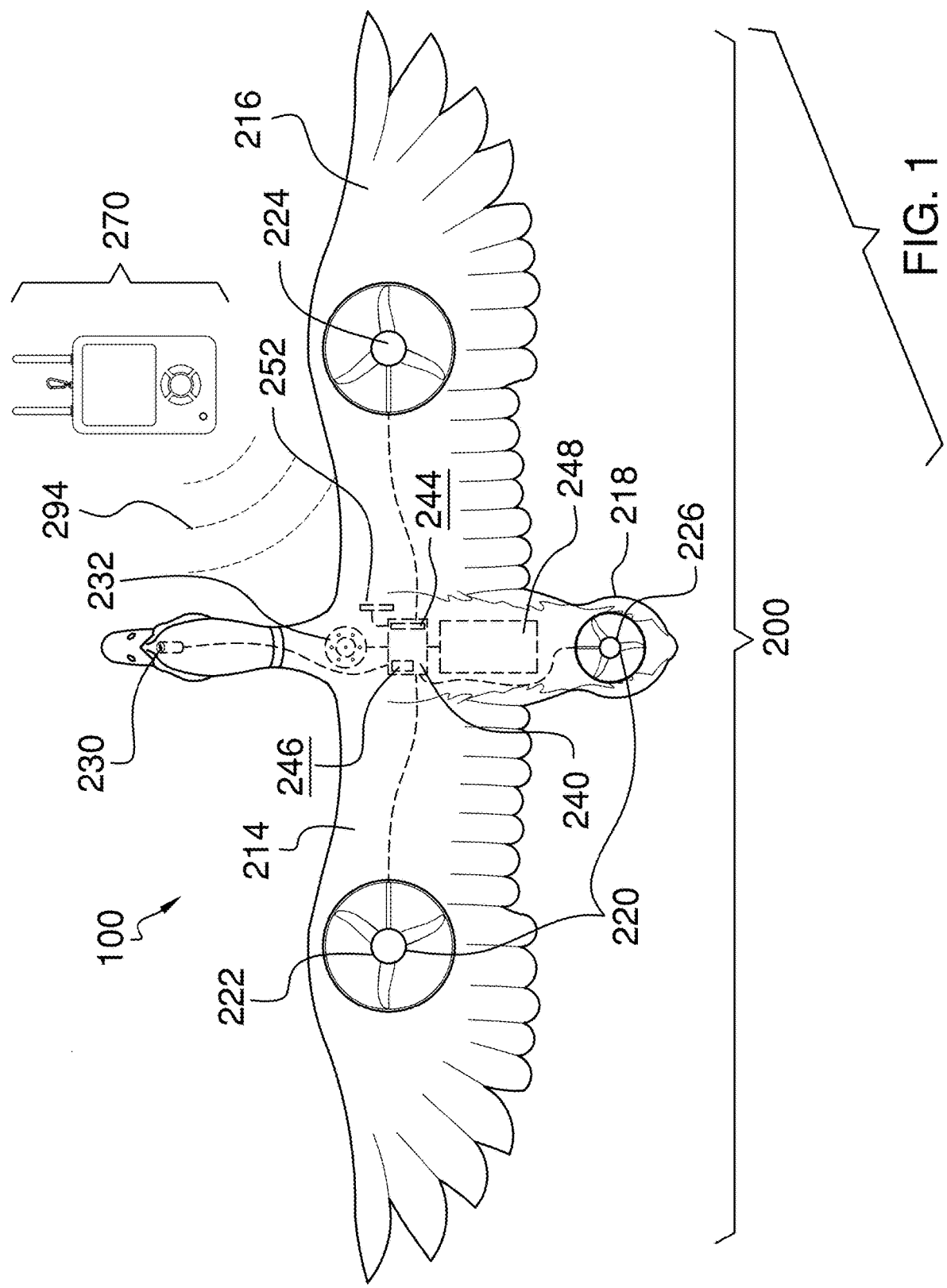
FIG. 1 is a top view of an embodiment of the disclosure.
Figure 2:
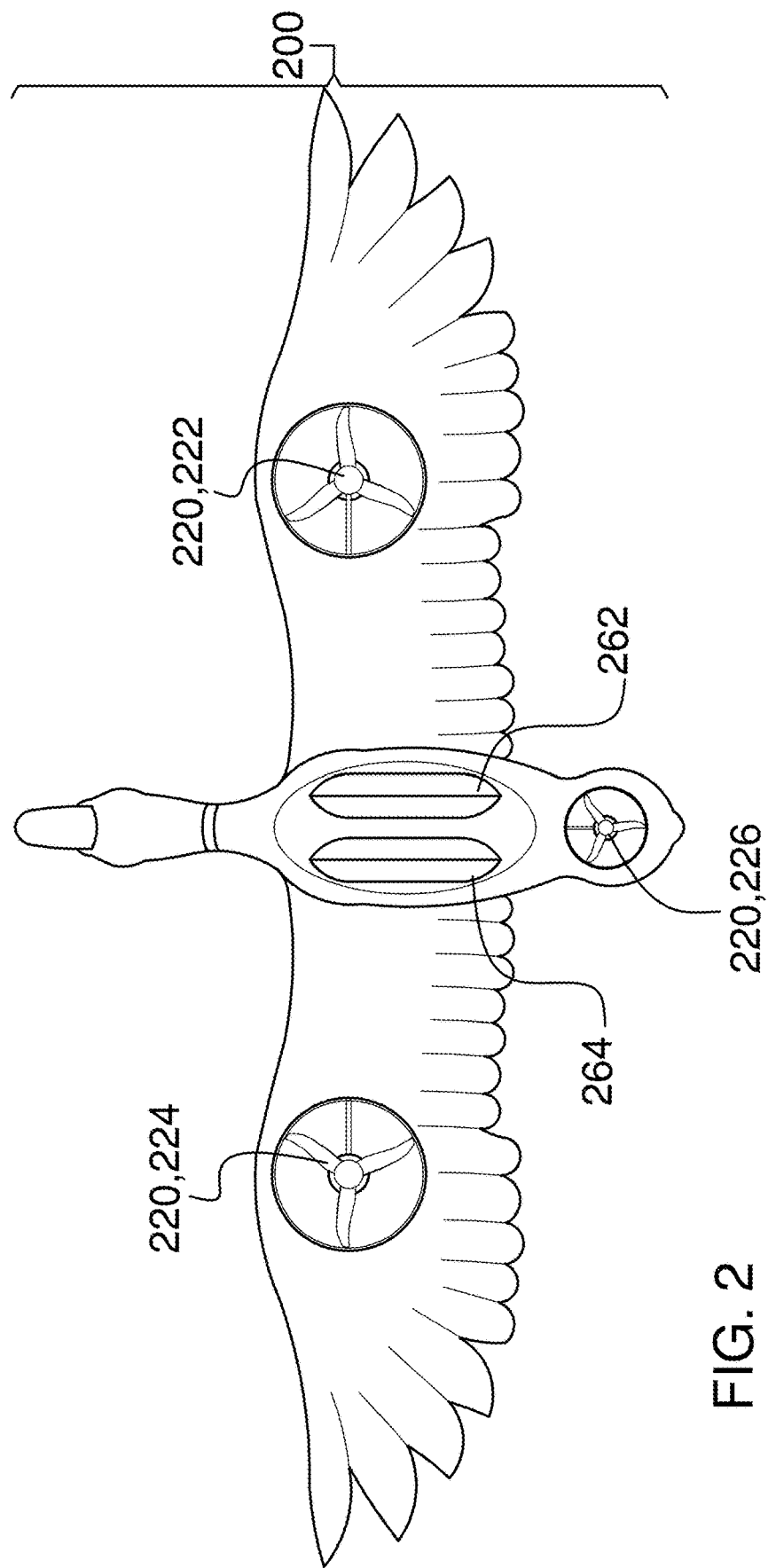
FIG. 2 is a bottom view of an embodiment of the disclosure.
Figure 3:
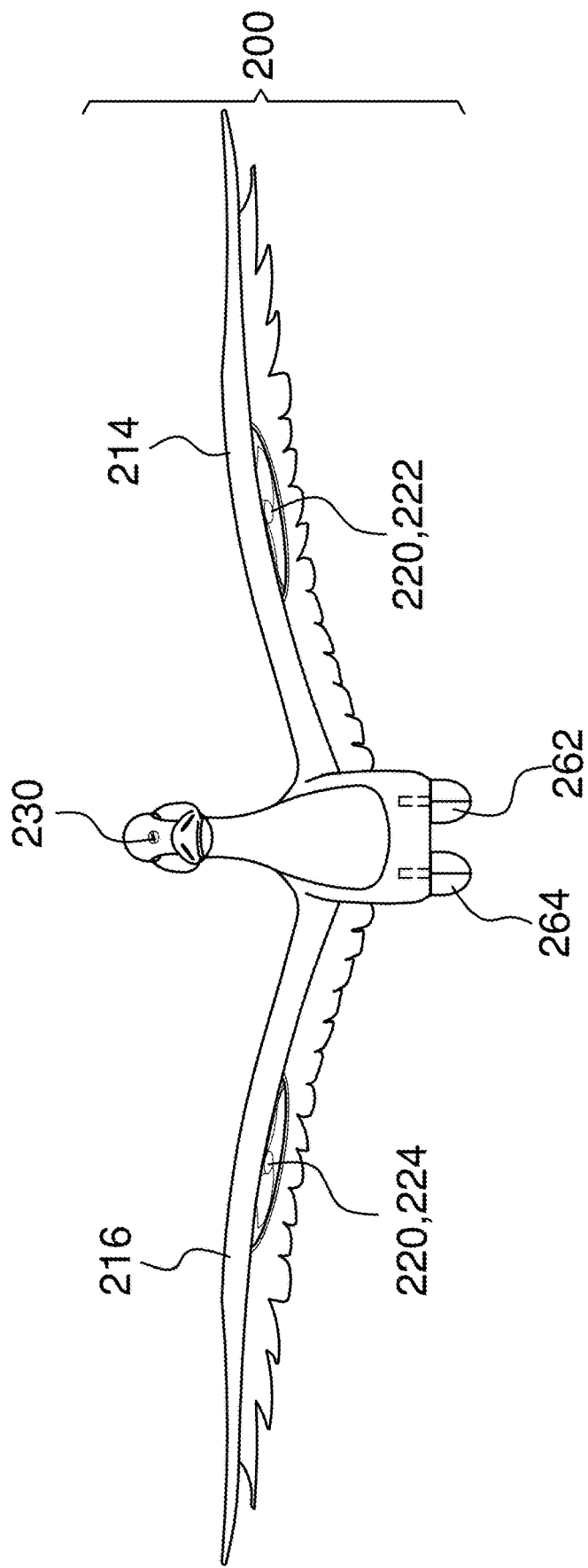
FIG. 3 is a front view of an embodiment of the disclosure.
Figure 4:
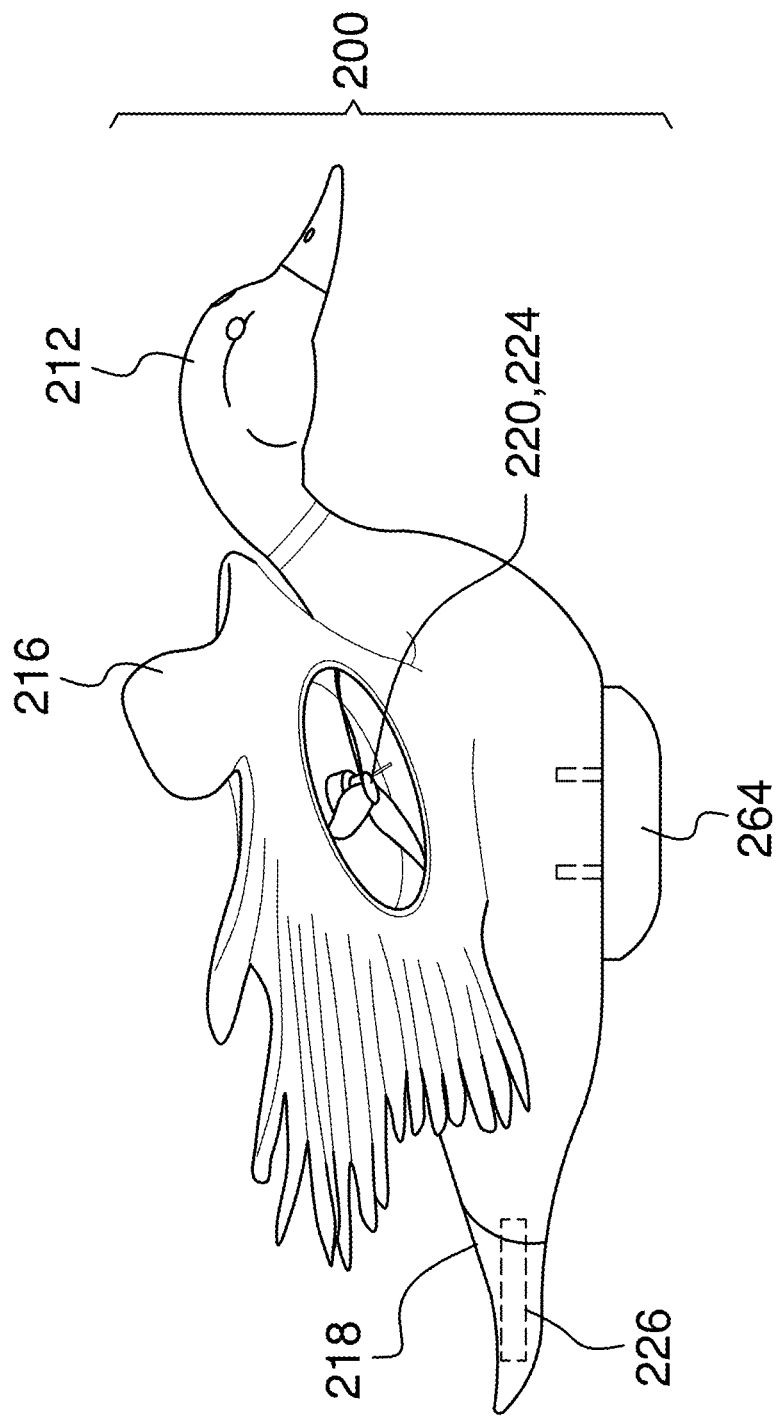
FIG. 4 is a side view of an embodiment of the disclosure.
Figure 5:
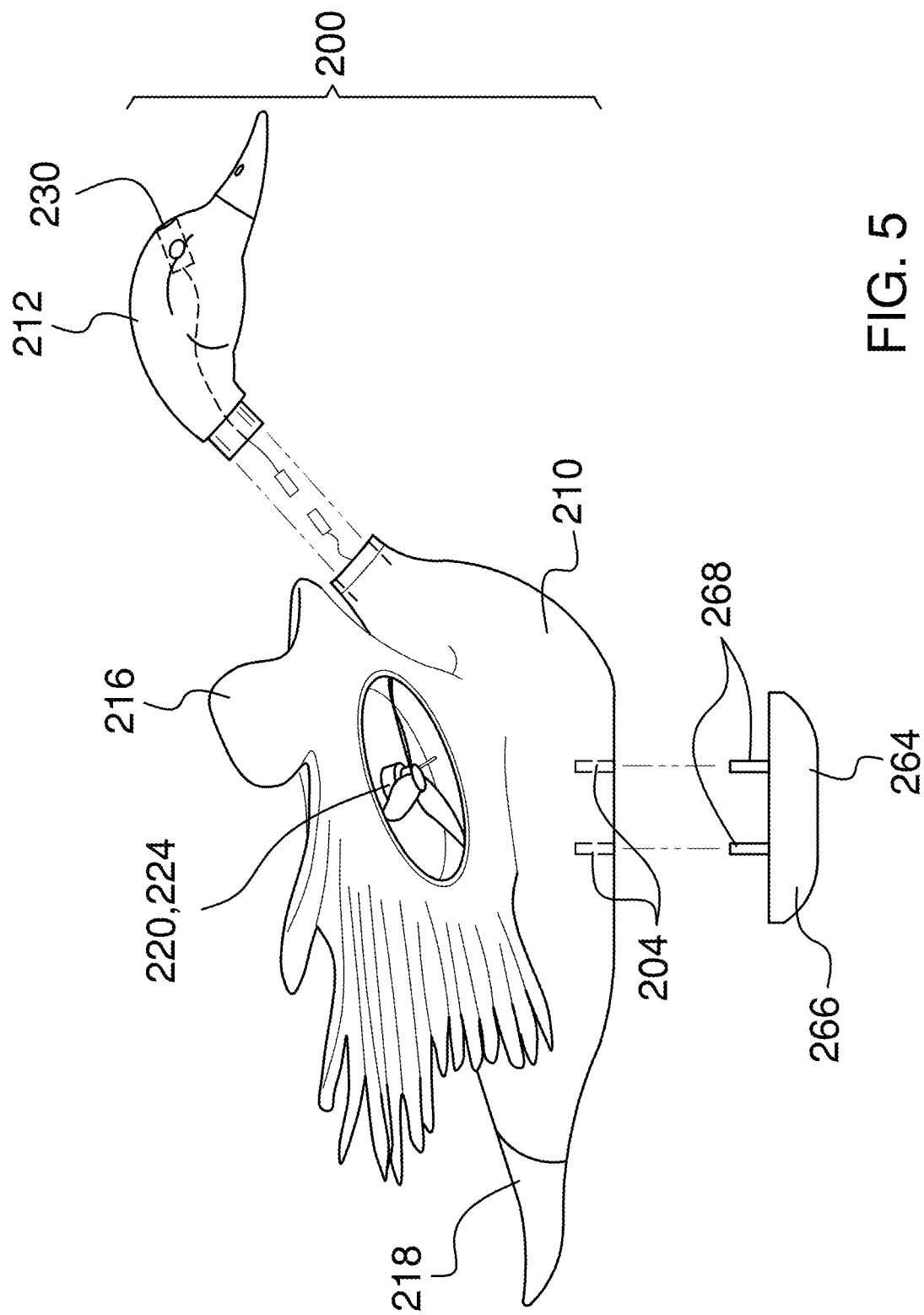
FIG. 5 is an exploded view of an embodiment of the 9 disclosure.
Figure 6:
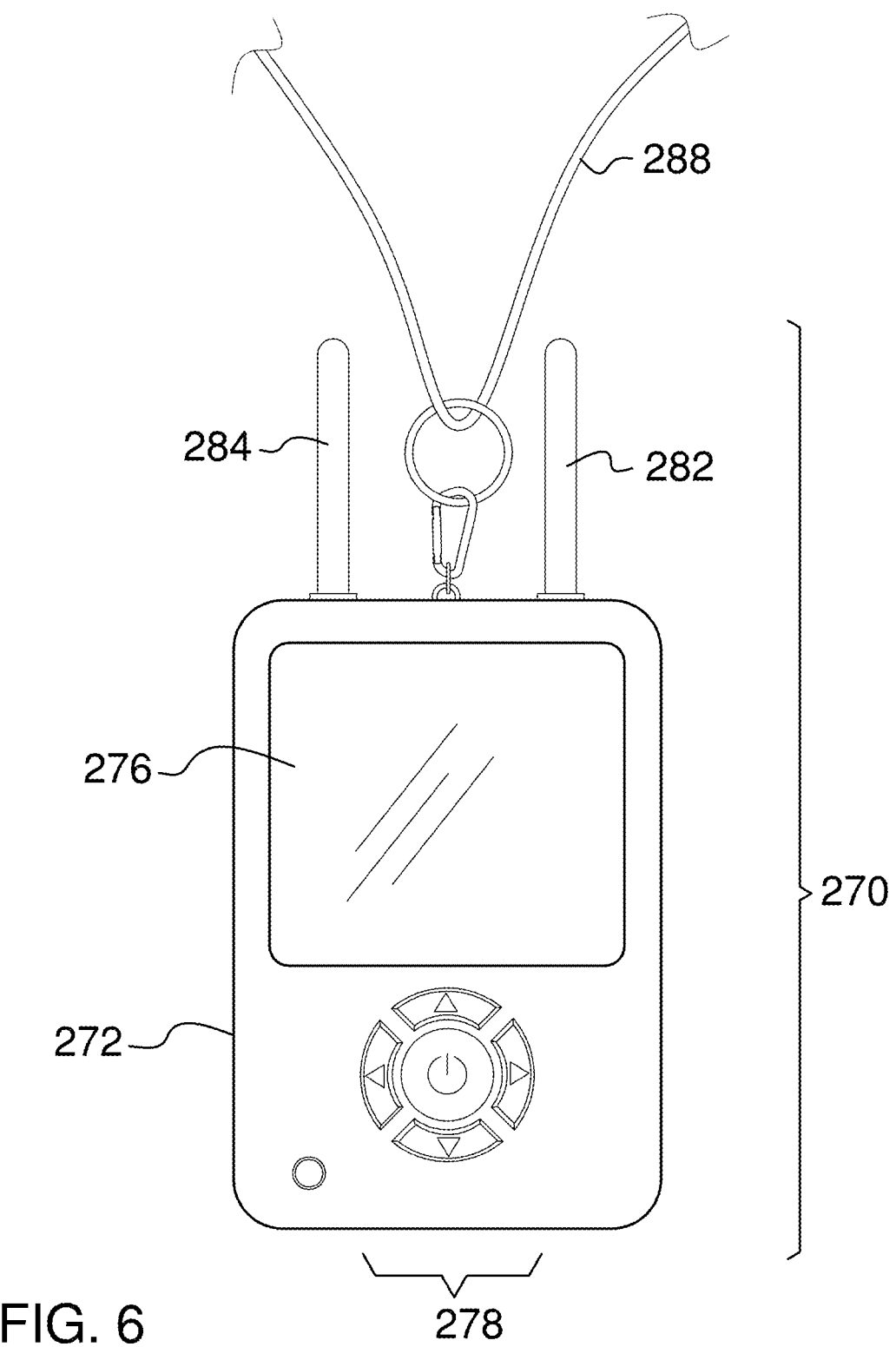
FIG. 6 is a detail view of an embodiment of the disclosure, illustrating the remote control unit.

Detailed reference will now be made to a first potential embodiment of the disclosure, which is illustrated in FIGS. 1 through 7.

The aerial waterfowl decoy 100 (hereinafter invention) comprises a drone 200, a plurality of floats, and a remote control unit 270. The drone 200 may be a tricopter unmanned aerial vehicle. The drone 200 may be adapted to resemble a waterfowl such that the drone 200 may be used as a decoy proximate to hunted waterfowl 910. The remote control unit 270 may be adapted for a user 950 to operate in order to control the flight of the drone 200. The remote control unit 270 may display video sent from a camera 230 within the drone 200. A sound transducer 232 in the drone 200 may be configured to play audible waterfowl calls. The plurality of floats may detachably couple to the bottom of the drone 200 to enable the drone 200 to float on a body of water 920. As a non-limiting example, the drone 200 may be adapted to resemble a duck.

The drone 200 may comprise an enclosure, a plurality of propellers 220, the camera 230, the sound transducer 232, a controller 240, and one or more decoy transceivers. The enclosure may comprise a decoy body 210, a decoy head 212, a decoy left wing 214, a decoy right wing 216, and a decoy tail such that the drone 200 is adapted to resemble the waterfowl. The enclosure may house the plurality of propellers 220, the camera 230, the sound transducer 232, the controller 240, the one or more decoy transceivers, and a battery 248.

The decoy body 210 may be adapted to resemble the breast and back of the waterfowl. The decoy body 210 may house the controller 240, the sound transducer 232, the one or more decoy transceivers, and the battery 248. The bottom of the decoy body may comprise a plurality of float receptacles 204 where the plurality of floats may detachably couple. The decoy head 212 may be adapted to resemble the head of the waterfowl. The decoy head 212 may house the camera 230. The decoy head 212 may be detached from the decoy body 210.

The decoy left wing 214 may be coupled to the left side of the decoy body 210 and the decoy right wing 216 may be coupled to the right side of the decoy body 210. The decoy tail 218 may be coupled to the rear of the decoy body 210. The decoy left wing 214, the decoy right wing 216, and the decoy tail 218 may be outstretched from the decoy body 210 to give the appearance of flight and to house the plurality of propellers 220. The plurality of propellers 220 may comprise three propellers. A left wing propeller 222 may be located on the decoy left wing 214. A right wing propeller 224 may be located on the decoy right wing 216. The left wing propeller 222 may be the same size as the right wing propeller 224. A tail propeller 226 may be located on the decoy tail 218. The three propellers may each be oriented to spin around axes of rotation that are substantially vertical. The three propellers may push air downward through the enclosure such that the plurality of propellers 220 provide lift for the drone 200. The speed of rotation of the three propellers may be controlled individually in order to change the height and direction of travel of the drone 200. In some embodiments, the tail propeller 226 may be smaller than the left wing propeller 222 and the right wing propeller 224.

The camera 230 may be an optical instrument that captures the video. The camera 230 may be electrically coupled to the controller 240. The video may be transmitted to the remote control unit 270 via the controller 240. The camera 230 may be mounted within the decoy head 212 and may be oriented to point forward.

The sound transducer 232 may convert an electrical signal into the audible waterfowl calls. The electrical signal may be modulated by the controller 240. As non-limiting examples, the sound transducer 232 may be one or more loudspeakers or one or more piezoelectric transducers. The audible waterfowl calls may be stored in one or more memory modules 244 for replay as needed.

The controller 240 may comprise a microcontroller and a timer 246. The microcontroller may be a computer processor that incorporates the functions of a central processing unit in the form of one or more integrated circuits. The microcontroller may be a multipurpose, clock driven, register based, digital-integrated circuit. The microcontroller may accept binary data as input, may process the binary data according to instructions stored in the one or more memory modules 244, and may provide results as output. The microcontroller may contain both combinational logic and sequential digital logic. The microcontroller may operate on numbers and symbols represented in the binary number system. The one or more memory modules 244 may be integral to the microcontroller, external to the microcontroller, or both. The binary input data provided to the controller 240 may come from the camera 230, the one or more decoy transceivers, the plurality of propellers 220, or any combination thereof. The results out of the controller 240 may control the camera 230, the sound transducer 232, the plurality of propellers 220, the one or more decoy transceivers, or any combination thereof. The timer 246 may time a subset of the operations of the drone 200. AS a non-limiting example, the audible waterfowl calls may repeat on a periodic cycle and the timer 246 may trigger the audible waterfowl calls.

The one or more decoy transceivers may communicate flight control commands, flight status, the video, or any combination thereof between the controller 240 and the remote control unit via one or more decoy antennas 252.

The battery 248 may comprise one or more energy-storage devices. The battery 248 may be a source of electrical energy to operate the controller 240, the plurality of propellers 220, the camera 230, the sound transducer 232, the one or more decoy transceivers, the one or more memory modules 244, and the timer 246. The battery 248 may be rechargeable and/or replaceable.

The plurality of floats may detachably couple to the bottom of the drone 200 in order to support the drone 200 on the body of water 920. The plurality of floats may comprise a left float that couples to the left bottom of the decoy body 210 and a right float 264 that couples to the right bottom of the decoy body 210. An individual float selected from the left float 262 and the right float 264 may comprise a float body 266 and one or more coupling brackets 268. The float body 266 may be made of a buoyant material. The one or more coupling brackets 268 may detachably couple to the plurality of float receptacles 204.

The remote control unit 270 may be adapted to be held and operated by the user 950 to remotely control and monitor the drone 200. The remote control unit 270 may comprise one or more remote control transceivers, a display screen 276, and a plurality of operator controls 278 housed in a remote control enclosure 272. The remote control unit 270 may be powered by a disposable or rechargeable internal battery.

The one or more remote control transceivers may be paired with the one or more decoy transceivers to communicate information between the drone 200 and the remote control unit 270. The one or more remote control transceivers may transmit and receive one or more wireless signals 294 via one or more remote control antennas.

In some embodiments, flight control commands, flight status, and the video may be communicated over a single wireless signal using a single transceiver and antenna at the drone 200 and a single transceiver and antenna at the remote control unit 270.

In some embodiments, flight control commands and flight status may be communicated over a flight wireless signal using a decoy flight transceiver and a decoy flight antenna at the drone and a remote control flight transceiver and a remote control flight antenna 282 at the remote control unit 270. The video may be communicated over a video wireless signal using a decoy video transceiver and a decoy video antenna at the drone 200 and a remote control video transceiver and a remote control video antenna 284 at the remote control unit 270.

The contents of the display screen 276 may show textual data, graphical data, video images, or any combination thereof. As non-limiting examples, the contents of the display screen 276 may represent operational menus, the video transmitted from the camera 230, operational status of the drone 200, settings menus, title screens, logo screens, splash screens, or any combination thereof.

The plurality of operator controls 278 may be adapted to be actuated by the user 950 in order to control operation of the drone 200. As non-limiting examples, the plurality of operator controls 278 may comprise a power ON/OFF control, drone directional controls, menu navigation controls, menu selection controls, or any combination thereof. In some embodiments, multiple functions may be assigned to a single operator control such that clicking the control may perform a first function while pressing and holding the same control may perform a second function. Alternatively, an operator control may perform the first function in one mode of operation and the second function in a different mode of operation. As non-limiting examples, the same operator controls may perform drone navigation and menu navigation at different times.

In some embodiments, the remote control unit 270 may be configured to be detachably coupled to a lanyard 288.

In use, a user 950 may position the drone 200 as a decoy on a body of water 920 or on land to attract hunted waterfowl 910 to the decoy. When positioned on the body of water 920, a plurality of floats coupled to the bottom of the drone 200 may buoy the drone 200 and the drone 200 may be flown into position on the body of water 920 using the plurality of propellers 220. When positioned on land, the drone 200 may be flown into place of placed manually. While in position as the decoy, the drone may play audible waterfowl calls through the sound transducer 232. Flight of the drone 200 may be controlled by the user 950 via the remote control unit 270.

Definitions

Unless otherwise stated, the words "up", "down", "top", "bottom", "upper", and "lower" should be interpreted within a gravitational framework. "Down" is the direction that gravity would pull an object. "Up" is the opposite of "down". "Bottom" is the part of an object that is down farther than any other part of the object. "Top" is the part of an object that is up farther than any other part of the object. "Upper" may refer to top and "lower" may refer to the bottom. As a non-limiting example, the upper end of a vertical shaft is the top end of the vertical shaft.

Throughout this document the terms "battery", "battery pack", and "batteries" may be used interchangeably to refer to one or more wet or dry cells or batteries of cells in which chemical energy is converted into electricity and used as a source of DC power. References to recharging or replacing batteries may refer to recharging or replacing individual cells, individual batteries of cells, or a package of multiple battery cells as is appropriate for any given battery technology that may be used. The battery may require electrical contacts which may not be illustrated in the figures.

As used in this disclosure, a "camera" may be a sensor that converts light into electric signals that encode the spatial orientation of the captured light in a manner that reproduces the images seen by a human eye.

As used herein, the words "couple", "couples", "coupled" or "coupling", may refer to connecting, either directly or indirectly, and does not necessarily imply a mechanical connection.

As used herein, "decoy" may refer to an object that is intended to attract attention and/or deceive.

As used in this disclosure, a "display" may be a surface upon which is presented an image, potentially including, but not limited to, graphic images and text, that is interpretable by an individual viewing the image. When used as a verb, "display" may be defined as presenting such an image.

As used herein, "front" may indicate the side of an object that is closest to a forward direction of travel under normal use of the object or the side or part of an object that normally presents itself to view or that is normally used first. "Rear" or "back" may refer to the side that is opposite the front.

As used in this disclosure, a "logo" may be artwork that is typically associated with an organization, brand, or activity. The logo may be textual, graphical, or both.

As used in this disclosure, a "microcontroller" may be a small computer, often on a single integrated circuit, containing a processor core, memory, and programmable input/output peripherals.

As used herein, "pair", "paired", and "pairing" may refer to a connection established between two wireless devices or to the process of establishing such a connection.

As used herein, the terms "processor", "central processor", "central processing unit", "CPU", or "microprocessor" may refer to a digital device that carries out the instructions comprising a computer program by performing basic arithmetic, logical, control, and input/out operations. The term "microprocessor" may additionally imply a level of miniaturization and power reduction that makes the device suitable for portable or battery operated systems.

As used herein, "propeller" may refer to a device comprising a rotating hub and radially-oriented blades. The blades may be set at a pitch such that rotation of the propeller exerts a force against a fluid such as air or water. In some embodiments, the pitch of the blades may be changed while the propeller is in use.

As used herein, "proximate to" may refer to the closeness of two objects. If a first object is proximate to a second object, then the first object may be adjacent to the second object but not necessarily touching the second object.

As used in this disclosure, "remote control" may refer to the establishment of control of a device from a distance or to the controlling device itself. Remote control is generally accomplished through the use of an electrical device that generates electrically based control signals that are transmitted via radio frequencies to the device. Some remote controls may use infrared light to communicate with a device.

As used herein, "subset" may refer to a relationship between two sets. Set 'A' may be said to be a subset of set 'B' if all elements of set 'A' are also elements of set 'B'. The definition of subset allows that the membership of set 'A' may equal the membership of set 'B'. A subset may also be an empty set, meaning that the subset may have no members.

As used herein, the word "substantially" may be construed to mean that two or more attributes are sufficiently the same such that the performance of the invention, from the perspective of one with ordinary skill in the art, is the same as through the two or more attributes are precisely the same.

As used in this disclosure, a "transceiver" may be a device that is used to transmit and/or receive signals. The signals may be audible, optical, or RF in nature.

As used in this disclosure, a "transducer" may be a device that converts a physical quantity, such as pressure or brightness, into an electrical signal or a device that converts an electrical signal into a physical quantity.

As used herein, "unmanned aerial vehicle" (UAV) or "drone" may refer to an aircraft without a human pilot aboard. UAVs may be remotely piloted and may comprise a certain degree of autonomy. Common uses for UAVs include, but are not limited to, surveillance, package delivery, and racing.

As used herein, "vehicle" may refer to a device that is used for transporting passengers, goods, equipment, or combinations thereof.

As used in this disclosure, "vertical" may refer to a direction that is parallel to the local force of gravity. Unless specifically noted in this disclosure, the vertical direction is always perpendicular to horizontal.

As used in this disclosure, "wireless" may be an adjective that is used to describe a communication channel that does not require the use of physical cabling.

With respect to the above description, it is to be realized that the optimum dimensional relationship for the various components of the invention described above and in FIGS. 1 through 7, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. An aerial waterfowl decoy comprising:
a drone, a plurality of floats, and a remote control unit;
wherein the drone is a tricopter unmanned aerial vehicle;
wherein the drone is adapted to resemble a waterfowl such that the drone is usable as a decoy proximate to hunted waterfowl;
wherein the remote control unit is adapted for a user to operate in order to control the flight of the drone;
wherein a sound transducer in the drone is configured to play audible waterfowl calls;
wherein the plurality of floats detachably couple to the bottom of the drone to enable the drone to float on a body of water.

2. The aerial waterfowl decoy according to claim 1
wherein the remote control unit displays video sent from a camera within the drone;
wherein the drone comprises an enclosure, a plurality of propellers, the camera, the sound transducer, a controller, and one or more decoy transceivers;
wherein the enclosure comprises a decoy body, a decoy head, a decoy left wing, a decoy right wing, and a decoy tail such that the drone is adapted to resemble the waterfowl;
wherein the enclosure houses the plurality of propellers, the camera, the sound transducer, the controller, the one or more decoy transceivers, and a battery.

3. The aerial waterfowl decoy according to claim 2
wherein the decoy body is adapted to resemble the breast and back of the waterfowl;
wherein the decoy body houses the controller, the sound transducer, the one or more decoy transceivers, and the battery;
wherein the bottom of the decoy body comprises a plurality of float receptacles where the plurality of floats detachably couple;
wherein the decoy head is adapted to resemble the head of the waterfowl;
wherein the decoy head houses the camera;
wherein the decoy head detaches from the decoy body.

4. The aerial waterfowl decoy according to claim 3
wherein the decoy left wing is coupled to the left side of the decoy body and the decoy right wing is coupled to the right side of the decoy body;
wherein the decoy tail is coupled to the rear of the decoy body;
wherein the decoy left wing, the decoy right wing, and the decoy tail are outstretched from the decoy body to give the appearance of flight and to house the plurality of propellers;
wherein the plurality of propellers comprise three propellers;
wherein a left wing propeller is located on the decoy left wing;
wherein a right wing propeller is located on the decoy right wing;
wherein the left wing propeller is the same size as the right wing propeller;
wherein a tail propeller is located on the decoy tail;
wherein the three propellers are each oriented to spin around axes of rotation that are substantially vertical;
wherein the three propellers push air downward through the enclosure such that the plurality of propellers provide lift for the drone;
wherein the speed of rotation of the three propellers is controlled individually in order to change the height and direction of travel of the drone.

5. The aerial waterfowl decoy according to claim 4
wherein the tail propeller is smaller than the left wing propeller and the right wing propeller.

6. The aerial waterfowl decoy according to claim 4
wherein the camera is an optical instrument that captures the video;
wherein the camera is electrically coupled to the controller;
wherein the video is transmitted to the remote control unit via the controller;
wherein the camera is mounted within the decoy head and is oriented to point forward.

7. The aerial waterfowl decoy according to claim 6
wherein the sound transducer converts an electrical signal into the audible waterfowl calls;
wherein the electrical signal is modulated by the controller.

8. The aerial waterfowl decoy according to claim 7
wherein the sound transducer is one or more loudspeakers or one or more piezoelectric transducers;
wherein the audible waterfowl calls are stored in one or more memory modules.

9. The aerial waterfowl decoy according to claim 8
wherein the controller comprises a microcontroller and a timer;
wherein the microcontroller is a computer processor that incorporates the functions of a central processing unit in the form of one or more integrated circuits;
wherein the microcontroller is a multipurpose, clock driven, register based, digital-integrated circuit;

wherein the microcontroller accepts binary data as input, processes the binary data according to instructions stored in the one or more memory modules, and provides results as output;

wherein the microcontroller contains both combinational logic and sequential digital logic;

wherein the one or more memory modules are integral to the microcontroller, external to the microcontroller, or both;

wherein the binary input data provided to the controller comes from the camera, the one or more decoy transceivers, the plurality of propellers, or any combination thereof;

wherein the results from the controller control the camera, the sound transducer, the plurality of propellers, the one or more decoy transceivers, or any combination thereof;

wherein the timer times a subset of the operations of the drone.

10. The aerial waterfowl decoy according to claim 9
wherein the one or more decoy transceivers communicate flight control commands, flight status, the video, or any combination thereof between the controller and the remote control unit via one or more decoy antennas.

11. The aerial waterfowl decoy according to claim 10
wherein the battery comprises one or more energy-storage devices;
wherein the battery is a source of electrical energy to operate the controller, the plurality of propellers, the camera, the sound transducer, the one or more decoy transceivers, the one or more memory modules, and the timer;
wherein the battery is rechargeable and/or replaceable.

12. The aerial waterfowl decoy according to claim 11
wherein the plurality of floats detachably couple to the bottom of the drone in order to support the drone on the body of water;
wherein the plurality of floats comprise a left float that couples to the left bottom of the decoy body and a right float that couples to the right bottom of the decoy body;
wherein an individual float selected from the left float and the right float comprises a float body and one or more coupling brackets;
wherein the float body is made of a buoyant material;
wherein the one or more coupling brackets detachably couple to the plurality of float receptacles.

13. The aerial waterfowl decoy according to claim 12
wherein the remote control unit is adapted to be held and operated by the user to remotely control and monitor the drone;
wherein the remote control unit comprises one or more remote control transceivers, a display screen, and a plurality of operator controls housed in a remote control enclosure;
wherein the remote control unit is powered by a disposable or rechargeable internal battery.

14. The aerial waterfowl decoy according to claim 13
wherein the one or more remote control transceivers are paired with the one or more decoy transceivers to communicate information between the drone and the remote control unit;
wherein the one or more remote control transceivers transmit and receive one or more wireless signals via one or more remote control antennas.

15. The aerial waterfowl decoy according to claim 14
wherein flight control commands, flight status, and the video are communicated over a single wireless signal using a single transceiver and antenna at the drone and a single transceiver and antenna at the remote control unit.

16. The aerial waterfowl decoy according to claim 14
wherein flight control commands and flight status are communicated over a flight wireless signal using a decoy flight transceiver and a decoy flight antenna at the drone and a remote control flight transceiver and a remote control flight antenna at the remote control unit;
wherein the video is communicated over a video wireless signal using a decoy video transceiver and a decoy video antenna at the drone and a remote control video transceiver and a remote control video antenna at the remote control unit.

17. The aerial waterfowl decoy according to claim 14
wherein the contents of the display screen shows textual data, graphical data, video images, or any combination thereof.

18. The aerial waterfowl decoy according to claim 17
wherein the contents of the display screen represent operational menus, the video transmitted from the camera, operational status of the drone, settings menus, title screens, logo screens, splash screens, or any combination thereof.

19. The aerial waterfowl decoy according to claim 18
wherein the plurality of operator controls are adapted to be actuated by the user in order to control operation of the drone.

20. The aerial waterfowl decoy according to claim 19
wherein the plurality of operator controls comprise a power ON/OFF control, drone directional controls, menu navigation controls, menu selection controls, or any combination thereof.

* * * * *